US006393409B2

(12) United States Patent
Young et al.

(10) Patent No.: US 6,393,409 B2
(45) Date of Patent: *May 21, 2002

(54) COMPUTER METHOD AND APPARATUS FOR OPTIMIZING PORTFOLIOS OF MULTIPLE PARTICIPANTS

(75) Inventors: Andrew R. Young; Evan Tick, both of New York, NY (US); Robert C. Towse, Jr., Stamford, CT (US); Yoon Chang, New York, NY (US); Roy Edwin Campbell, II, New York, NY (US); Joan Ka-Wai Tse, New York, NY (US); Stephen David Reddy, Washington Crossing, PA (US); Young-Sup Lee, White Plains, NY (US); John Scowcroft, New York, NY (US)

(73) Assignee: Morgan Stanley Dean Witter & Co., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,605

(22) Filed: Oct. 31, 1997

(51) Int. Cl.[7] ............................................... G06F 17/60
(52) U.S. Cl. ....................................................... 705/37
(58) Field of Search ............................ 705/35, 36, 37, 705/39

(56) References Cited

U.S. PATENT DOCUMENTS

| | | | | |
|---|---|---|---|---|
| 4,346,442 A | * | 8/1982 | Musmanno | 705/36 |
| 4,376,978 A | * | 3/1983 | Musmanno | 705/36 |
| 4,412,287 A | | 10/1983 | Braddock, III | 364/408 |
| 4,597,046 A | * | 6/1986 | Musmanno | 705/36 |

(List continued on next page.)

FOREIGN PATENT DOCUMENTS

| | | |
|---|---|---|
| EP | 0448800 A1 | 10/1991 |
| GB | 2258061 A | 1/1993 |
| GB | 2274345 A | 7/1994 |
| WO | WO 90/10910 | 9/1990 |
| WO | WO 91/11571 | 10/1990 |
| WO | WO 95/06918 | 3/1995 |
| WO | WO 95/26005 | 9/1995 |
| WO | WO 96/17317 | 6/1996 |
| WO | WO 97/07475 | 2/1997 |
| WO | WO 97/08640 | 3/1997 |

OTHER PUBLICATIONS

Hayes, John R., "Acquistion is Fine, But Organic Growth is Better," Forbes, vol. 158, No. 15, p. 52(4), Dec. 1996.*

"Reuters Ltd.—Company Report," Investext, pp. 1–4, Jul. 1, 1992.*

Sales, Robert, "Play Fair With the Little Guy," Wall Street & Technology, vol. 15, No. 1, p. 42(5), Jan. 1997.*

(List continued on next page.)

*Primary Examiner*—Tariq R. Hafiz
*Assistant Examiner*—Susanna Meinecke-Diaz
(74) *Attorney, Agent, or Firm*—Pennie & Edmonds LLP (57) ABSTRACT

Computer technology for substantially optimizing portfolios of multiple participants is disclosed. Preferably the portfolios of such multiple participants comprise fixed income instruments. The disclosed systems and methods include using at least one computer system for storing digital data representing portfolio holdings of multiple parties and, in particular, for each participant storing in the computer memory data representing constraints with respect to the desired portfolio. The method and system comprise optimizing using an optimization engine portfolio and constraint information of multiple participants so as to generate a set of trades that would substantially optimize participants portfolios with respect to a known objective.

26 Claims, 4 Drawing Sheets

U.S. PATENT DOCUMENTS

| | | | | |
|---|---|---|---|---|
| 4,674,044 A | | 6/1987 | Kalmus et al. ............. | 364/408 |
| 4,677,552 A | | 6/1987 | Sibley, Jr. .................... | 364/408 |
| 4,799,156 A | * | 1/1989 | Shavit et al. ................. | 705/26 |
| 4,903,201 A | | 2/1990 | Wagner ...................... | 364/408 |
| 5,077,665 A | | 12/1991 | Silverman et al. .......... | 364/408 |
| 5,101,353 A | * | 3/1992 | Lupien et al. ................ | 705/37 |
| 5,126,936 A | * | 6/1992 | Champion et al. ............ | 705/36 |
| 5,132,899 A | | 7/1992 | Fox ............................ | 364/408 |
| 5,148,365 A | | 9/1992 | Dembo ....................... | 364/402 |
| 5,168,446 A | | 12/1992 | Wiseman .................... | 364/408 |
| 5,267,148 A | | 11/1993 | Kosaka et al. ............. | 364/408 |
| 5,270,922 A | | 12/1993 | Higgins ...................... | 364/408 |
| 5,297,031 A | | 3/1994 | Gutterman et al. ......... | 364/408 |
| 5,305,200 A | | 4/1994 | Hartheimer et al. ........ | 364/408 |
| 5,375,055 A | | 12/1994 | Togher et al. .............. | 364/408 |
| 5,414,838 A | | 5/1995 | Kolton et al. ............... | 395/600 |
| 5,500,793 A | * | 3/1996 | Deming, Jr. et al. .......... | 705/37 |
| 5,508,913 A | * | 4/1996 | Yamamoto et al. ........... | 705/37 |
| 5,517,406 A | | 5/1996 | Harris et al. ................ | 364/408 |
| 5,590,325 A | | 12/1996 | Kolton et al. ............... | 395/615 |
| 5,644,727 A | * | 7/1997 | Atkins ......................... | 705/40 |
| 5,689,652 A | * | 11/1997 | Lupien et al. ................ | 705/37 |
| 5,774,880 A | * | 6/1998 | Ginsberg ..................... | 705/36 |
| 5,799,287 A | * | 8/1998 | Dembo ........................ | 705/36 |
| 5,819,238 A | * | 10/1998 | Fernholz ...................... | 705/36 |

OTHER PUBLICATIONS

CCH Tax Law Editors. *1997 U.S. Master Tax Guide*, p. 465, 79th Edition. Chicago, Nov. 1995.

CPLEX Optimization, Inc. Using the CPLEX Callable Library. Version 4.0. 930 Tahoe Blvd., Bldg. 802, Incline Village, NV 89451. http://www.cplex.com, 1995.

H. Dahl et al., *Some Financial Optimization Models: I Risk Management; II Financial Engineering*. In "Financial Optimization," S.A. Zenios, Editor. Cambridge University Press, Cambridge, 1993.

D.G. Luenberger. *Linear and Nonlinear Programming*. Addison–Wesley, Reading, Massachusetts, Second Edition, 1984.

P.A. Minton. *Morgan Stanley's Portfolio Analytics System*. (Presentation) Domestic Traders Conference, Morgan Stanley, New York. Mar. 11–13, 1994.

Adamidou et al., *The Optimal Portfolio System: Targeting Horizon Total Returns Under Varying Interest–rate Scenarios*.

H.Banks, *Great Expectations*, Forbes, Dec. 2, 1996.

J. Orford, *Trading on the Frontier*, Plan Sponsor, Oct. 1996.

Proctor Lippincott Spring, O'Brien & Co., *OptiMark, IBM, Dow Jones, State Street Bank, Pacific Stock Exchange and Chicago Board Options Exchange Team Up to Introduce Revolutionary Trading System*.

Introducing a New Way to Trade, Optimark.

* cited by examiner

COMPUTER METHOD AND APPARATUS FOR OPTIMIZING PORTFOLIOS OF MULTIPLE PARTICIPANTS

FIELD OF THE INVENTION

This invention relates to computer technology for optimizing portfolios of multiple participants and, in particular, for optimizing portfolios of fixed income instruments.

BACKGROUND OF THE INVENTION

It is well known that computer technology can be effectively employed for financial applications. It is also known to employ computers that execute optimization programs, such as programs based on liner programming techniques, so as to achieve financial goals. For example, computer technology that analyzes and optimizes a portfolio held by a given entity is known. Computer systems have also been employed as an intermediary in transactions where multiple parties desire to trade specific equity instruments. In such computer applications, optimization may be employed to facilitate trading of an equity of interest. However, the inventors are not aware of computer technology developed for trading holdings of multiple participants, where a computer acting as an intermediary processes entire portfolios of the participating entities and generates trades that optimize portfolios for a desired result, particularly for portfolios of fixed income instruments.

Portfolio-based trading, for example, exists in the equities market, where investors may buy or sell a portfolio of stocks on an aggregate basis. The investor provides a statistical description of the portfolio, usually including how closely it tracks the S&P 500 index, the sector distribution of the portfolio, and a measure of the diversification of the portfolio. The broker then commits to trade the portfolio of unknown stocks for a fixed fee at the prevailing market price at a pre-arranged point in time, typically the market daily close. Because the broker only knows the "statistical" composition of the portfolio, the investor feels more comfortable that the broker is unable to affect the closing prices. Because of the statistical relationship between the portfolio and the index, the broker feels comfortable that the investor cannot unload a portfolio of unattractive securities. An important component of such a transaction is the independent price of equities contributed by the public transaction records of the equity markets.

The vast majority of fixed income transactions are performed on a principal basis where the broker takes the opposite side of the transaction from the investor. The lack of adequate fixed income transaction records and the broad range of structures and maturities of fixed income instruments creates a significant barrier to developing the confidence on either side of the transaction that pricing is fair. Thus, it is desirable to provide a system that employs unbiased pricing and reassures the investors that the transaction is a fair deal. Further, it is desirable to provide computer technology that supports such fixed income transactions and, in particular, enables multiple parties to participate in the transactions. In particular, it is desirable to develop computer technology that would allow multiple investors to specify constraints on their portfolio holdings and, within those constraints, allocate by the optimization computer process fixed income holdings to individual investors participating in the transaction.

As noted, in general, optimization techniques for financial applications are known. For example, Adamidou et al., *Financial Optimization,* S. A. Zenios, Ed., Cambridge University Press, Cambridge, 1993, describe the Prudential-Bache Optimal Portfolio System, based on linear optimization of security holdings. This system emphasizes "scenario analysis," which involves the evaluation of stochastic price models over user views of volatility employing a linear programming optimization constrained by duration, convexity, and return of holdings.

Optimization methodologies relating to financial applications are surveyed in H. Dahl, A. Meeraus, and S. A. Zenios, *Some Financial Optimization Models: I Risk Management,* Financial Optimization, S. A. Zenios, Editor, Cambridge University Press, Cambridge, 1993; and in H. Dahl, A. Meeraus, and S. A. Zenios, *Some Financial Optimization Models: II Financial Engineering,* Financial Optimization, S. A. Zenios, Editor, Cambridge University Press, Cambridge. 1993. Linear programs are described for general immunization of liabilities with fixed-income securities and "dedication" matching of assets to liabilities. The discussed programs become mixed-integer programs if round lots are to be traded. Mixed-integer programs are discussed for optimal settlement of financial forwards in a specific case of mortgage-backed securities and for optimal structuring of collateralized mortgage obligations.

Such publications on financial engineering do not teach computer technology that enables multi-party portfolio trading in fixed income instruments, wherein computer-driven optimization aids in rebalancing portfolios of multiple participants. Yet, there is a need for such technology. For example, there is a need to provide computer technology that enables multiple investors to recognize the economic benefits of selling bonds at a price below the price originally paid thereby obtaining a tax deduction. Accordingly, there is a need to develop technology that would enable investors to exchange portfolio holdings so as to substantially maximize the tax deductible loss. It is believed that technology for such portfolio trading between multiple parties that enables them to substantially optimize trades so as to substantially maximize tax advantages has not been developed by others.

SUMMARY OF THE INVENTION

Although the system and method of the present invention relates to computer technology applicable to a wide array of portfolio optimizations in trading among diverse parties, the preferred embodiment relates to a computer system and method that provide a capability of taking advantage of refunds on taxes paid within the previous three years by maximizing book losses on trades of multiple participants. The preferred embodiment provides technology that enables trades as swaps among multiple parties while keeping the trades out of the market. The advantage of swapping between portfolios of participating firms versus transacting in the open market is that large scale trades can be executed without adversely affecting the market trading. In addition, the specific preferred embodiment enables swap members to buy discount bonds as replacements, which may be problematic in the open market but provides further, two advantages.

The computer technology of the preferred embodiment facilitates a solution to a multi-party book-loss optimization. In general, the input to the computer system of the preferred embodiment comprises a set of bond portfolios owned by a group of firms, and the output comprises the set of trades which substantially maximizes the participant firms' total book losses. The implementation of the preferred embodiment avoids churning (i.e., buying and selling the same security) and wash sales (i.e., buying and selling a sufficiently similar security) and, therefore, reduces a risk of degeneracy in the process of maximizing book losses.

In addition, individual firms typically have portfolio composition constraints that must remain satisfied in any intermediated transaction implemented by the system. Such constraints may include fixed market value of holdings within given sectors and maximum holdings of given names. The implementation of the preferred embodiment provides means for satisfying such constraints.

Although a particular implementation of the preferred embodiment relates to producing tax deductions, a person skilled in the art will realize that it can be generalized to allow different participants to have different objectives and still produce multi-party portfolio-based optimized transaction. Furthermore, as will be understood by a person skilled in the art, extensions are possible where the participants provide prices at which they would be willing to buy or sell rather than using uniform prices provided by the intermediary entity, as in the preferred embodiment. In general, a person skilled in the art will appreciate that the invention can be extended to accommodate differing views among the participants on the economic attributes of the fixed-income instruments in their portfolios.

BRIEF DESCRIPTION OF THE DRAWINGS

The invention will be better understood when taken in conjunction with the following detailed description and accompanying drawings, in which.

DETAILED DESCRIPTION OF THE PREFERRED EMBODIMENTS

The following detailed description of the preferred embodiments is organized as follows: first, computer architecture of the preferred embodiment is disclosed. Next, a specific illustrative application addressed by the technology of the preferred embodiment is described. Thereafter, software programming developed for implementing the illustrative application of the preferred embodiment is disclosed.

Computer Architecture of the Preferred Embodiment

Figure 1:
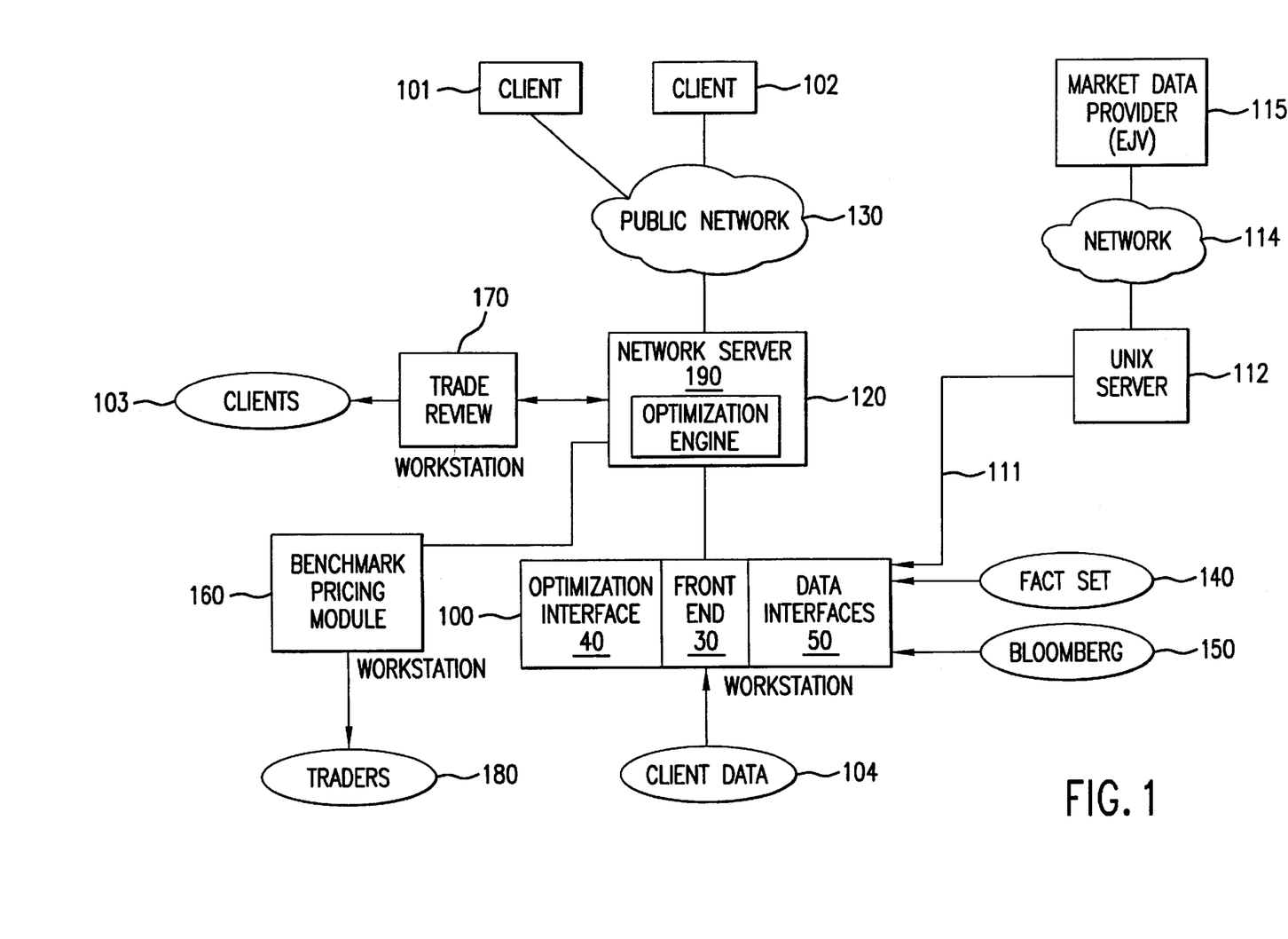
FIG. 1 illustrates computer architecture and organization of the preferred embodiment.

Computer architecture of the preferred embodiment is depicted in FIG. 1. In general, the system depicted in FIG. 1 receives data representing portfolios of fixed income instruments owned by multiple investors (also referred to as clients, firms, and participants) and constraints associated with the portfolio as inputs. The system then generates a set of trades so that the resultant portfolios of the investors are substantially optimized with respect to a given economic benefit.

The data representing portfolio information and specific client constraints is provided by the clients participating in the transaction to the workstation 100. The workstation 100 can be a personal computer based on the MicroSoft operating system or it can be another computer such as a Sun workstation. The client data can be provided to the workstation 100 in various ways, for example, via Internet over a public switching network 130 as known in the art. Client data provided over a network is first received by the network server 120 which then transmits the data to the workstation 100 over the internal network. Also, the portfolio data and the constraints can be encoded on a magnetic medium and then entered into the workstation.

Client portfolio data and their constraints are then translated into a uniform format discussed below and entered into a front end module, symbolically illustrated as 30, which is resident on workstation 100. The front end 30 is preferably a large Excel workbook written in Visual Basic. Alternatively, other software packages may be employed.

The workstation 100 stores digital information relating to securities in the clients' portfolios, such as information on pricing and rating. Such information is collected from public databases, such as EJV and Bloomberg and may be entered manually or provided in a magnetic medium. An on-line link to such information may also be provided. In particular, the link to the EJV database is accomplished via an internal network connection 111 to a Unix server 112 which, in turn, provides an external link to the EJV resources available on-line. The data received from the external sources of information is provided to the data interface 50 of workstation 100, which converts this data for entry into the front end 30.

In the preferred embodiment, data obtained from external sources includes: bond indicatives (e.g., coupon, maturity, etc.) from EJV, Electronic Joint Venture (EJV) Capital Markets Services (http://www.ejv.com) 1996, and Bloomberg, Bloomberg L.P. 499 Park Ave., NY, N.Y. 10022 (http://www.bloomberg.com) 1996, databases, insurance company holdings from the Capital Access FINCOM database, Capital Access Corp. Mountain Heights Center, 430 Mountain Ave. Murray Hill, N.J. 07974 (http://www.interactive.net/~cac) 1996, sector descriptions from EJV and Fact Set, FactSet Research Systems Inc., One Greenwich Plaza, Greenwich, Conn. 06830 (http://www.factset.com) 1996.

The data stored in the front end 30 is then processed by optimization interface 40 and supplied to the optimization engine 190 which preferably employs the CPLEX optimizer. See CPLEX Optimization, Inc., Using the CPLEX Callable Library, Version 4.0, 930 Tahoe Blvd., Bldg. 802, Incline Village, Nev. 89451 (http://www.cplex.com) 1995, incorporated herein by reference. The CPLEX product is installed on the server 120 which can be implemented as a personal computer, such as Dell Optiplex, GXPRO, or for example, as a Unix workstation such as Sun, SPARC-station 20. It should be noted that the server 120 is capable of supporting other workstations such as 100 so that in some embodiments several multi-party portfolio-based exchanges can be implemented using the optimization engine of the server.

The CPLEX optimization engine of the preferred embodiment is a linear optimizer for solving linear programming problems encountered in a wide variety of resource allocation programs. CPLEX provides several solvers for different problem environments. See http:\\www.cplex.com. The CPLEX Linear Optimizer Base System provides a basic linear programming environment using continuous variables and employing algorithms mainly based on a well-known Simplex method. It also supports a variety of input/output formats such as MPS files, known in the art. This system can handle problems with millions of constraints and variables. The CPLEX Mixed Integer Solver (MIP) is an addition to the CPLEX Linear Optimizer Base system. It employs various heuristic algorithms such as a branch-and-bound technique to handle the difficult optimization problems involving integers. The CPLEX Barrier/QP Solver is an optimizer for solving linear and quadratic problems. CPLEX can be run on various computer platforms. The CPLEX programs are also available as parallel versions so that they can be run on multiple-CPU systems for increased performance.

The optimization engine 190 accepts portfolio-related data and constraints in a specific form, described below, in order to perform optimization. Accordingly, the portfolio-related data and constraints should be processed so as to enable the optimization engine 190 to perform the required processing. Workstation 100 includes the optimization interface software 40, which extracts information from the Excel front end and translates it so as to enable desired processing by the optimization engine. After the data has been processed by the optimization interface 40 it is supplied to the optimization engine 190 on the server 120.

The optimization engine 190 generates a set of trades which are then provided to the investors for review. The trade review computer 170 receives information from the optimization engine on the server 120 and formats it for clients' review. Thereafter, investors may accept or reject the trades and may modify their constraints. After the trade has been found acceptable for the participants, it is repeated with the prices provided by the traders of the entity that facilitates the multi-party exchange. To accomplish this, the benchmark pricing software running on workstation 160 processes the instruments comprising the trade in relation to the stored data concerning the expertise of the traders employed by the entity facilitating the exchange. The appropriate traders then provide pricing information for the instruments that the benchmark pricing software allocated to them. Based on this price information the final optimization transaction is then performed.

It should be noted that the computers of the disclosed embodiment are, in general, known devices that include a central processing unit, primary and secondary memory, and network interfaces, as well as other well known hardware components. As discussed, these computers are configured for the special purpose of providing substantial optimization of multi-party trades using software discussed herein.

In another embodiment, the system of FIG. 1 can be enhanced to allow participants to enter their own data directly to the front end over the Internet. The system can also be enhanced by posting recommended transactions continuously on the Internet.

Exemplary Application of the Preferred Embodiment

Tax law allows corporations to apply losses realized in a given year against gains incurred within the previous three years to receive tax rebate for previous taxes paid. See 1996 U.S. *Master Tax Guide,* 79th Edition, Chicago, November 1995, CCH Tax Law Editors. The exemplary application discussed herein utilizes computer technology of the preferred embodiment so as to rebalance a set of bond portfolios by swapping participants' respective holdings so that total book losses over all participants are substantially optimized, allowing the participant firms to realize tax savings.

A tax swap is beneficial if tax refunds received today have positive economic value considering the present values of the bonds swapped to achieve the refund. If two firms own underwater bonds (i.e., bonds which values have dropped in comparison to their original values), swapping such bonds for bonds owned by others may enable the firms to take advantage of the tax refund. Tax-related advantages can, for example, result from swapping an underwater bond with a par bond and with a discount bond as discussed below.

Swapping an underwater bond with a par bond that would produce the same yield as the underwater bond requires that the par bond necessarily has a higher coupon. Accordingly, the tax refund received today as a result of a swap is offset by higher future taxes paid on the greater coupons of the par bond. Also, the principal par amount invested in the underwater bond is necessarily larger than the principal amount of the par bond purchased as a result of the swap. Accordingly, some protected principal is lost due to the swap. The net of these effects depends on the discount factor, so that for reasonable discount factors, as illustrated below, the net effect favors doing the swap.

For example, consider a swap of a $100MM par amount of a 6.750% coupon underwater bond, having a current market price of 97.411% yielding 7.750%, for par bonds of equal yield, i.e., 7.750% coupon. Thus the owner of the underwater bonds obtains after the swap $97.411MM par amount of the new bonds with 7.750% coupon. For the purposes of this illustration, it is assumed that all coupons are paid annually, that both bonds mature in three years from the day of the swap, and the tax rate is 35%.

The net economic benefit of swapping the bonds is determined as follows. The seller of the underwater bonds receives $97.411MM plus a tax refund of 35%×(100%−97.411%)×$100MM=$0.906MM. The same entity then uses the $97.411MM to buy new par bonds, netting the tax refund. On three successive years, it receives, after taxes, a coupon of (100%−35%)×7.750%×$97.411MM=$4.907MM. On the third year, it also receives the return of the $97.411MM principal. The opportunity cost of foregoing owning the underwater bond includes its coupons and return principal. The after-tax coupons would have been (100%−35%)×6.750%×$100MM=$4.388MM. The return principal would have been $100MM.

This analysis is summarized in Table 1, which uses a discount factor of 65%×7.75%=5.0375%.

TABLE 1

| | (Amounts in Millions) | | | |
|---|---|---|---|---|
| year | old bond | new bond | net cash flow | discounted cash flow |
| 0 | 98.317 | (97.411) | 0.906 | 0.906 |
| 1 | (4.388) | 4.907 | 0.520 | 0.495 |
| 2 | (4.388) | 4.907 | 0.520 | 0.471 |
| 3 | (104.388) | 102.318 | (2.069) | (1.785) |
| | PROFIT | | | 0.087 |

The breakeven discount rate that makes the swap beneficial is 2.8%. The profitability of the swap increases with increasing maturity of the bonds, decreasing price of the underwater bonds, and increasing discount rate.

Alternatively, one may swap for market-discount bonds, i.e., bonds currently trading at a discount. Normally, securities are taxed on an effective-yield basis; however, market-discount securities have different taxation. If the income from the bond exceeds the financing cost for the bond (which is assumed to be true in this example), the investor may elect to pay tax on cash flow rather than yield. For a discount bond, tax on cash flow is always lower than tax on yield. If the investor makes this election, there is an additional tax due on excess of sale or redemption proceeds over cost. This election may be made on a bond by bond basis.

Swapping to a market-discount bond achieves greater economic benefit than swapping to a par bond, as illustrated in the example below. For simplicity, consider that the underwater bond, discussed in the previous example, is swapped with a bond of identical attributes (but different issuer to avoid a wash sale). The only modifications to the previous analysis are the cash flows of the new discount bonds. As a result of the swap, the new bonds are bought for $97.411MM, netting the tax refund. On three successive years, the investor receives, after taxes, a coupon equal to the coupon foregone. On the third year, the investor also receives the return principal of $100MM, however, we are required to pay tax on the accrual from the discount price. Thus, we receive $100MM plus $4.388MM minus 35% of ($100MM−$97.411MM)=$103.48MM. This analysis is summarized in Table 2 below, which illustrates that the resulting profit is greater than that of the previous scenario.

TABLE 2

(Amounts in Millions)
Swapping for Discount Bond

| 0 | 98.317 | (97.411) | 0.906 | 0.906 |
|---|---|---|---|---|
| 1 | (4.388) | 4.388 | 0.000 | 0.000 |
| 2 | (4.388) | 4.388 | 0.000 | 0.000 |
| 3 | (104.388) | 103.481 | (0.906) | (0.782) |
| | | PROFIT | | 0.124 |

Software Implementation

In general, a multi-party book loss optimization problem of the exemplary application described above is well-suited to linear programming, a known optimization technique. Book loss is defined as the par sold multiplied by the difference in book price and market price for the securities available in the secondary market at the time of the transaction.

Table 2 below defines variables used in the following discussion, where indexes i, j, k correspond to the set of all bonds, firms, and sectors, respectively.

TABLE 3

Basic Variable Definitions

| symbol | meaning |
|---|---|
| | variables |
| $BUY_{i,j}$ | par amount of bond i bought by firm j |
| $SELL_{i,j}$ | par amount of bond i sold by firm j |
| | constant inputs |
| $CURPAR_{i,j}$ | original par amount of bond i held by firm j |
| $PRICE_{i,j}$ | firm j's transaction price for bond i |
| $BOOK_{i,j}$ | firm j's book price for bond i |
| $ACCRUED_i$ | accrued interest for bond i |
| $PV_{i,j}$ | $PRICE_{i,j} + ACCRUED_i$ (firm j's transaction cost for bond i) |
| $DUR$ | modified-present-value duration for bond i |
| $CON_i$ | present-value convexity for bond i |
| $IN_{i,j,k}$ | bond i belongs to firm j's k-th sector (0, 1) |

In the following discussion it is assumed that $PRICE_{i,j} = PRICE_i$ for all j, because fixing a single mid-market price for each security is a practical necessity in conducting the tax swap. However, the model presented herein is more general, allowing, in other embodiments, different firms to transact at different prices for a given security as will be understood by a person skilled in the art.

The objective function representing total book loss, optimized by the system, is expressed as follows:

$$\max \sum_{i,j} SELL_{i,j}(BOOK_{i,j} - PRICE_{i,j})$$

This function is optimized subject to the following constraints:

Bond conservation: for a given bond, the par amounts bought and sold over all participating firms must net to zero, i.e., there is a closed universe of bonds.

$$\sum_j BUY_{i,j} = \sum_j SELL_{i,j} \ \forall \ i$$

Present value neutrality: for every firm, the total of all trades must be present-value neutral.

$$\sum_i BUY_{i,j} PV_{i,j} = \sum_i SELL_{i,j} PV_{i,j} \ \forall \ i$$

Duration neutrality: the total of all trades must leave the dollar-duration within a reasonable tolerance. This is a relaxed form of dollar-duration-neutral trading. The constraints are applied on a per party (j) basis.

$$\$DUR_j^\Delta = \sum_i BUY_{i,j} PV_{i,j} DUR_i - \sum_i SELL_{i,j} PV_{i,j} DUR_i$$

$$\$DUR_j^{curr} = \sum_i CURPAR_{i,j} PV_{i,j} DUR_i$$

$$\$DUR_j^{min} - \$DUR_j^{curr} \le \$DUR_j^\Delta \le \$DUR_j^{max} - \$DUR_j^{curr} \ \forall \ j$$

These constraints bound the permissible change in dollar duration around a given target range ($\$DUR_j^{min}$, $\$DUR_j^{max}$). For example, bounds equivalent to ±½ (one-half) year modified duration would be typical. If only a portion of a participating firm's entire portfolio is employed in a swap, this constraint applies to that portion only, so that the change resulting from the swap would be diluted in the overall portfolio.

Convexity neutrality: These constraints are similar to the above constraint, except that $\$DUR_j$ is replaced by $CON_j$. The total of all trades must leave the convexity within a reasonable tolerance. These constraints, bounding the permissible change in convexity, represent a relaxed form of convexity-neutral trading. For example, bounds of $\$CON^{min} = \$CON^{curr}$ and $\$CON^{max} = \infty$ are typical. Since all trades are conducted at fair market prices, a decrease in convexity need not be a concern. The lower convexity would be reflected in lower security prices.

Other market-value weighted attributes: Yield and rating are constrained in an identical manner as duration and convexity. In other embodiments, other portfolio characteristics can be defined in a manner similar to duration and convexity.

Par-value weighted attributes: Maturity and coupon are constrained in a manner similar to duration and convexity; however, par-value rather than market-value is used for weighing. As noted, in other embodiments, other characteristics can be similarly defined.

Proceeds bounding within sectors: The total of all trades must leave the present value (within every sector) between reasonable (predefined) bounds. These constraints can enforce present-value-neutral trading, possibly weakened to provide additional flexibility. Alternately, the use of these constraints may provide an opportunity to employ the transaction in order to reallocate the portfolio. These constraints, expressed below, are applied on a per party (j) basis.

$$SPV^{\Delta}_{j,k} = \sum_i BUY_{i,j} PV_{i,j} IN_{i,j,k} - \sum_i SELL_{i,j} PV_{i,j} IN_{i,j,k}$$

$$SPV^{min}_{i,j,k} - PV^{curr}_{i,j,k} \leq SPV^{\Delta}_{j,k} \leq SPV^{max}_{i,j,k} - PV^{curr}_{i,j,k} \quad \forall j, \forall (k < k_j)$$

These constraints bound the permissible change in proceeds within a sector around a given target range ($SPV_j^{min}$, $SPV_j^{max}$). For example, quality sectors used in these optimizations categorize bonds by Moody's and S&P ratings, as well as by a numerical scale. Name constraints are a special case of sector constraints, pinpointing an individual bond issuer. As understood by a person skilled in the art, it is sometimes useful to constrain buys and sells directly, as shown below, in addition to the net change constraint above.

$$\sum_i BUY_{i,j} PV_{i,j} IN_{i,j,k} \leq MAXBUY_{jk}$$

$$\sum_i SELL_{i,j} PV_{i,j} IN_{i,j,k} \leq MAXSELL_{jk}$$

The sectors include an industry sector type, such as Financials, Utilities, Industrials and Sovereign/Agencies, as well as other types of sectors including rating, broad maturity, fine maturity, duration, convexity, EJV sector, EJV subsector, EJV subsubsector, holdings, issuer, SIC code, and other sectors customized to specific firms. Another category of sectors is a specification of bonds that cannot be sold to a given firm.

Non-negativity and boundedness: the amount bought and sold must be non-negative, and the amount sold must not be greater than the original par amount owned. Additionally, the amount bought must not exceed the total amount owned by all other firms.

$$0 \leq BUY_{i,j} \leq \sum_{i,k \neq j} CURPAR_{i,k} \quad \forall i, j$$

$$0 \leq SELL_{i,j} \leq CURPAR_{i,j} \quad \forall i, j$$

If the right-hand-side of the buy equation is zero, then no variable $BUY_{i,j}$ is required in the model, thereby reducing its complexity. Furthermore, the potential for churning with respect to this security would be eliminated.

In the model defined by the above objective function and constraints, churning and wash sales may occur when more than one party owns the same bond. Churning refers to buying and selling of the same security to generate spurious book loss. Churning involves swapping bonds with the same CUSIP (Committee on Uniform Security Identification Procedure) code. A wash sale involves bonds that satisfy the following three similarity conditions: 1)the same issuer, 2)maturities within five years of each other, and 3)coupons within 25 bp.

To eliminate churning and wash sales, the results obtained by employing the above continuous model may then be modified by computing net sales of each bond for each firm. The net sales would then be presented as a resultant portfolio produced by the transaction. However, it is unlikely that the resultant allocation of bonds would be substantially optimal with respect to the goal of book loss maximization, and therefore this is not the preferred approach. For example, if each of two firms hold two bonds A and B, co-members of a given sector, the objective function may be maximized by a wash sale of bonds A and B: each sells the other both A and B. If only net sales are taken into account these sales would net zero for each bond, and, therefore, no trades and book losses would be produced. The optimal solution, however, is for one firm to sell A and the other to sell B, allowing each to achieve a book loss.

The formulation of the objective function, provided above, maximizes achieved book loss. In an alternative embodiment, this function can be generalized as follows to include the economic value of tax deferral:

$$\max \left\{ \sum_{i,j} SELL_{i,j}(BOOK_{i,j} - PRICE_{i,j}) + \sum_{i,j} BUY_{i,j}(DEFERRALBENEFIT_{ij}) \right\}$$

A person skilled in the art, based on this discussion, can also implement optimization with respect to this function. However, given that variables are defined as bought and sold amounts, churning and wash sales still remain an issue. However, if variables were to be defined as the net change in the amount bought and sold, the churning/wash sales problem would be avoided, but the objective function becomes problematic. This happens because there is a benefit only from a net sale, not from a net gain, $$\max \left\{ \sum_{i,j} NET_{i,j} \max(0, BOOK_{i,j} - PRICE_{i,j}) \right\}$$

which is nonlinear. Alternatively, the churning and wash sales can be avoided by introducing non-linearities into the constraints rather than the objective function:

$$\sum_{i,j} SELL \times BUY_{i,j} = 0$$

The implementation of the preferred embodiment for the exemplary application considered here, enhances the continuous model discussed above by employing mixed-integer techniques. The enhancement of the preferred embodiment effectively addresses the issue of churning and wash sales (including taking into account bonds owned by the subsidiaries of the same parent).

In the preferred embodiment, $SELL_{i,j}$ and $BUY_{i,j}$ are set to be mutually exclusive for all bonds i owned by a firm j and at least one other firm. This formulation translates into a mixed-integer linear program. The CPLEX software used in the referred embodiment provided for solving mixed-integer linear programming as well as for specifying mutual exclusion. See CPLEX Optimization, Inc. Using the CPLEX Callable Library. Version 4.0 930 Tahoe Blvd., Bldg. 802, Incline Village, Nev. 89451. http://www.cplex.com, 1995 incorporated herein by reference. In alternative embodiments that employ optimization software without this mutual-exclusion facility, but which support zero-one variables, the previous described formulation is appended with the following expressions to achieve the desired result (See also D. G. Luenberger, *Linear and Nonlinear Programming*, Addison-Wesley, Reading, Mass., Second Edition, 1984, incorporated herein by reference):

$$SELL_{i,j} - \delta_{i,j}M \leq 0$$

$$\sum_{i,k \in \theta} BUY_{i,k} + \delta_{i,j}M \leq M$$

$$\delta_{i,j} \in (0, 1)$$

where θ is the set of subsidiaries owned by the parent of firm j and M is a suitably large number. The Boolean variables $\delta_{i,j}$ select either buying ($\delta_{i,j}=0$) or selling ($\delta_{i,j}=1$) of bond i by firm j. As a result, inflated sales (fueled by churned buys) are disallowed. Note however that this alone will not prevent wash sales of similar, yet not identical, securities.

Two or more affiliated parties (e.g., subsidiaries of the same parent firm) cannot trade with each other, yet may require different constraints in order to not be treated as a single entity. In the preferred embodiment this requirement is modeled in the following manner. If a bond i is originally held by at least one of the affiliated parties θ, two cases are possible: (1) i is not held by any party outside of θ; or (2) at least one party outside of θ holds i. Accordingly, in the first case, the constraint $BUY_{i,\theta}=0$ is introduced and, in the second case, the constraint introduced is as follows:

$$\sum_{j \in \theta} BUY_{i,j} < \sum_{j \in \theta} SELL_{i,j}$$

The above constraints do not guarantee that no trades between affiliated parties would occur, but these constraints drastically reduce such trades. The system of the preferred embodiment automatically checks for trades slipping through these constraints for manual correction after optimization.

Although mixed-integer programs such as presented before are difficult to solve optimally for large data sets, sufficiently satisfactory solutions can be obtained using the method of the preferred embodiment as described herein. Results that are not strictly optimal, but are sufficiently optimized to be acceptable, may also be referred to as optimal in this discussion.

Figure 2:
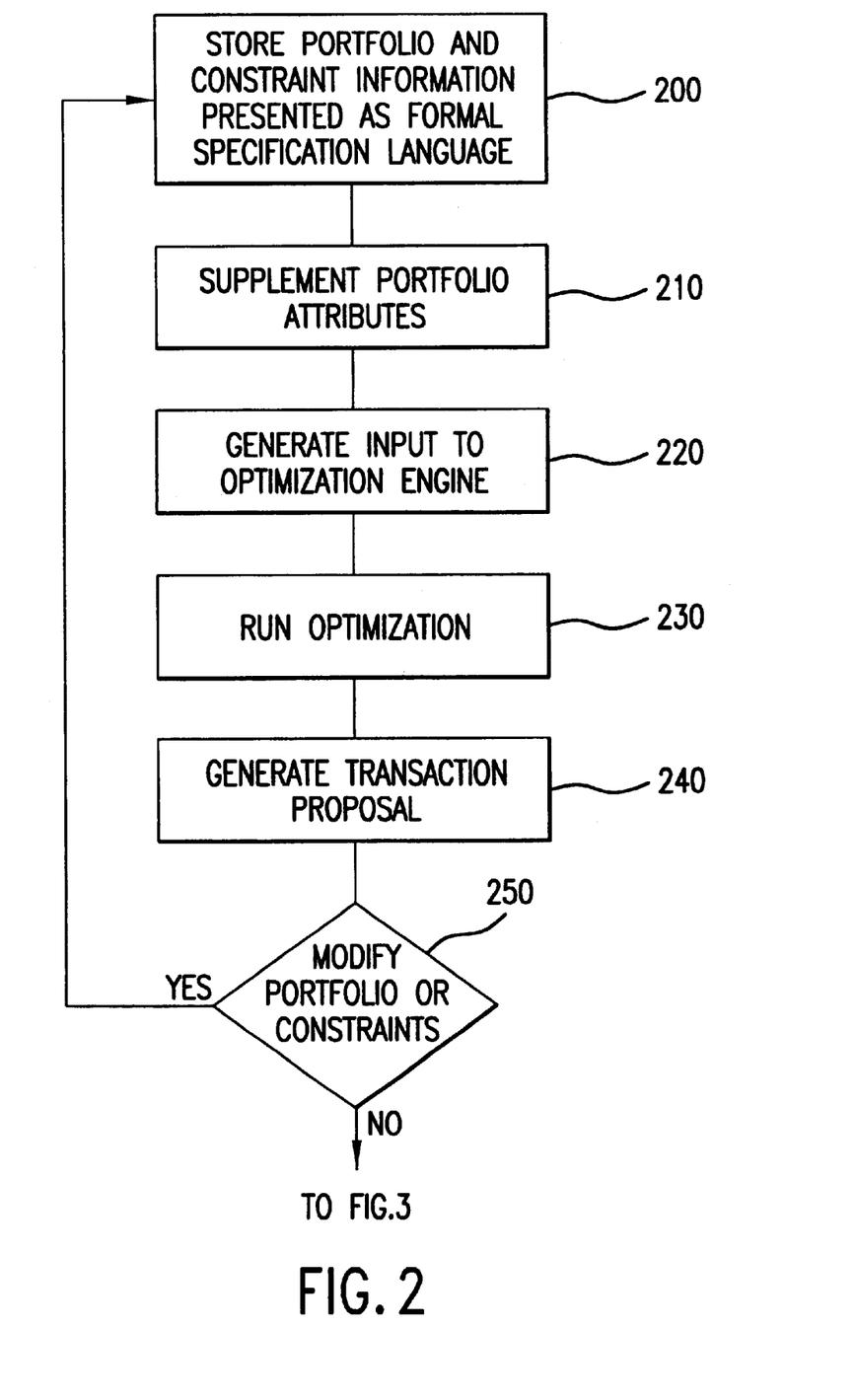
FIGS. 2 and 3 illustrate the flowchart of the operation of the system of the preferred embodiment.
Figure 3:
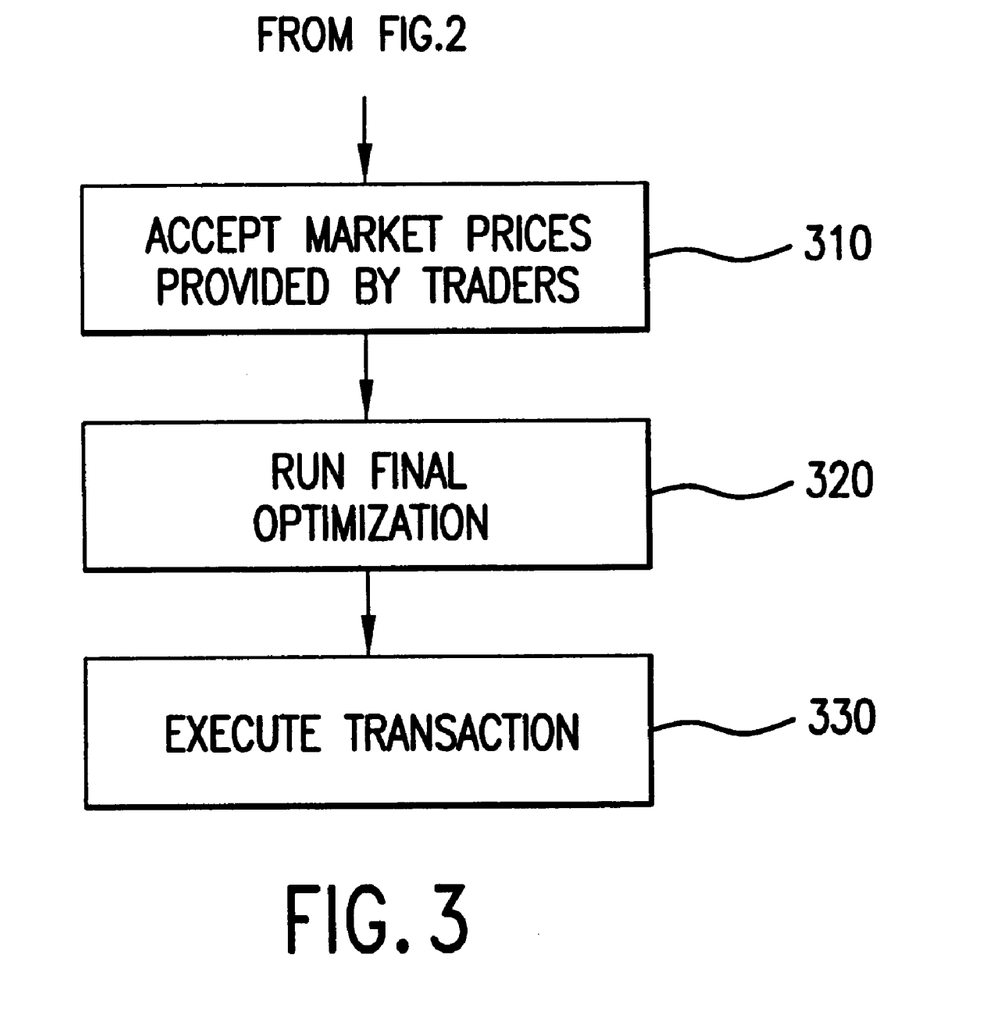

FIGS. 2 and 3 illustrate the processing performed by the preferred embodiment with respect to the illustrative tax swap application. Initially, workstation 100 accepts portfolio information from clients who wish to participate in a swap. Portfolio information includes specifications of bonds, uniquely identified with a CUSIP, par holdings and book prices. In addition, clients provide constraints defining their requirements for the resultant portfolio. The clients may submit their portfolio and constraint information in various formats, for example, in the form of a spread sheet such as provided by Microsoft Excel. As discussed previously, client portfolios may be provided to the system in various ways, e.g., by e-mail or on a magnetic medium or simply entered by the operator. The encoding of information received from the clients is not limited to a specific format.

The front end 30 of the preferred embodiment is a large Microsoft Excel workbook written in Visual Basic. At step 200 the front end 30 accepts the client information that has been translated manually into a formal specification using a syntax discussed below. In general, the front end stores portfolio and constraint information.

User and System constraints can be specified and stored in the front end 30. The user constraints allow participants of the tax swap to specify customized constraints to ensure that their individual requirements are met. For example, firm i may require that it would not buy bonds rated lower than AA. The system constraints are specified by the entity running the intermediary tax swap system itself so as to guarantee certain invariants, such as the constraints discussed above.

Constraints on sectors specify (1) which sectors are constrained; (2) over what statistic the constraint is defined; and (3) the bounds of the constraint. The sectors within a constraint are defined either as an individual identifier or any number of identifiers connected with logical operators.

The following grammar for name expressions is used to specify sectors.

letter: one of
        a b c d e f g h i j k l m n o p q r s t u v w x y z
        A B C D E F G H I J K L M N O P Q R S T U V W X Y Z
    digit: one of
        0 1 2 3 4 5 6 7 8 9
    number:
        digit
        digit number
    char:
        letter
        digit
    op:
        | &
    identifier:
        char
        identifier char
    unary:
        identifier
        ~identifier
    sector:
        unary
        (unary)
        unary op binary
        (unary op binary)

An identifier is either a full CUSIP, a name (a six character CUSIP), or an alpha-numeric string previously defined as a sector of a certain bond. For example "~(AAA/AA)" specifies all bonds rated lower than AA. The "|" operator is logical OR; "&" is logical AND; and "~" means NOT. Parenthesis are used in a conventional manner. A full CUSIP specifies an exact bond issue, whereas a name specifies an issuer. For example "912827T6 & 312911" specifies a single Treasury bond and a group of mortgages. A client firm, for example, may specify names it refuses to buy, e.g., "~369856".

The following grammar is used for constraint specification:

applies-to: one of
        or-applies
        and-applies
    or-applies: one of
        number
        number|or-applies
    and-applies: one of
        number
        number & and-applies
    value: one of
        #PV
        #LOSS
        #DUR
        #CONV
        #MAT
        #COUPON
        #RATING variable: one of
  #ALL
  #SECTOR
  #FINAL
  #BUY
  #SELL
  #NET
  #CURR
  #AVG
numerator-value:
  value
  value numerator-value
numerator-variable:
  variable
  variable numerator-variable
numerator:
  numerator-value numerator-variable
denominator-value:
  value
  value denominator-value
denominator-variable:
  variable
  variable denominator-variable
denominator:
  denominator-value denominator-variable
fraction:
  numerator
  numerator-denominator
method: one of
  #REL
  #ABS
  #PROP
constraint:
  applies-to print-name sector fraction method bounds In the above grammar, "print-name" is an optional string that provides textual representation of the constraint for summary purposes. The "Or-applies" expressions specify a group of firms in which a given constraint applies individually to each firm. The "And-applies" expressions specify a group of firms to which the constraint applies collectively.

In general, a constraint is of the form:

$$L \le \frac{\text{numerator}}{\text{demoninator}} \le U$$

A pair of numbers (L, U) represents the lower and upper bounds placed on the constraint. The numerators and (optional) denominators define the statistic. The numerator represents the base statistic, and the denominator can be used to normalize the base statistic.

The base statistic is defined by both variable and value specifications. For example, if a firm is interested in constraining the market-value-weighted dollar duration of all bonds it buys, the numerator is set to #PV#DUR#BUY. The variable #BUY specifies that the set of bonds bought should be considered. The values #PV#DUR specify that the desired statistic is present value times duration times par amount.

Other variables that can be used are #SELL (bonds sold), #NET (buys minus sells), #SECTOR (pay attention to the sectors specified in the constraint), #ALL (ignore sectors), #FINAL (original plus buys minus sells), and #AVG (buys plus sells divided by two). These variables can also be combined as in the example above. The values include #CONV (convexity), #MAT (maturity), #COUPON (coupon), #RATING (rating) and #LOSS (book price minus price), as well as other values defined by the user, as will be understood by one skilled in the art.

As mentioned, the denominator is used to optionally normalize the base statistic. For example the previous numerator #PV#DUR#BUY needs to be normalized by the denominator #PV to compute a valid duration. All the variables specified above can be used in the denominator. In addition the variables used in the denominator include #CURR (current portfolio) and #NONE (denominator equals one).

Commonly used constraints may also be specified as macros. Constraints can be bound with respect to #ABS (absolute value of bounds), #REL (a value relative to a base value, i.e., base value±percentage points), and #PROP (proportional values, i.e., base value multiplied by percentages; the base value is always computed from the incoming portfolios).

For example, suppose firms 3 and 4 both wish to individually constrain that the convexity of their resulting portfolios be greater than the convexity of their initial portfolios. Such a constraint is specified as follows:

| firm | numerator | denominator | method | lower | upper |
|------|-----------|-------------|--------|-------|-------|
| 3\|4 | #PV#CONV#ALL | #PV | #REL | 0 | 1000 |

Here the zero lower bound guarantees that the original convexity cannot be lower than the resulting convexity. The large upper bound indicates that convexity is allowed to increase up to 1000% of the original value (essentially unlimited).

At step 210 the portfolio attributes collected from the clients are supplemented with additional information in order to specify the full set of attributes for optimization. As discussed above, such additional data is obtained from remote databases, such as EJV, Capital Access, Fact Set, and Bloomberg. As discussed above, the EJV data is electronically accessed and translated for entry into the front end. Some attributes may need to be entered by an operator, for example, data from Bloomberg concerning uncommon bond.

Next at 220 an optimization interface module 40 is invoked to translate the portfolio and constraint data, stored in the specified form in the front end 30, into a linear program format that can be processed by the optimization engine 190. The optimization interface can, for example, be implemented as a program written in C++. The optimization interface is described in further detail in connection with FIG. 4.

The optimization engine at step 230 solves the linear programming matrix provided to it by the optimization interface. Although as indicated previously, the optimization engine is CPLEX, a commercial program from CPLEX Optimization Inc., an alternative optimization program capable of handling mixed integer linear programming can be used. (See description of CPLEX above and CPLEX Optimization, Inc. Using the CPLEX Callable Library. Version 4.0 930 Tahoe Blvd., Bldg. 802, Incline Village, Nev. 89451. http://www.cplex.com, 1995, incorporated herein by reference). As noted, in the preferred embodiment, CPLEX is installed on server 120. In this way, multiple front-end programs can access the remote optimizer over the network.

After the optimizer has completed its processing, a transaction proposal is generated at step 240. After the clients review the transaction proposals, the system receives client feedback at step 250. If any client wants to modify the portfolio or constraint information, the processing goes back to step 200 and the steps described above are repeated.

If all clients agree on the proposed transactions, as illustrated in FIG. 3, the system accepts at step 310 actual trading prices of the bonds from the corresponding traders. Specifically, a benchmark pricing module is invoked which automatically summarizes a tax swap transaction solution into forms appropriate for trader input. (In FIG. 1 the benchmark pricing module is illustrated as running on workstation 160). The bonds traded in the swap are automatically split among the appropriate traders and an appropriate benchmark Treasury is automatically computed for them. Since the tax swap requires a set of fair (mid-market) prices provided by the intermediary entity and agreed upon by all the parties, the benchmark pricing software module generates the mid-market prices at which all the bonds in the tax swap are traded. These prices are based on mid-market quotes from corporate traders of the intermediary entity, who is not part of the transaction. Rather than gathering up-to-date price quotes for each optimization during a given transaction, corporate bonds are quoted as a spread to the yield of a benchmark security (typically, a US Treasury (UST)). The bonds may also be quoted as a spread to the interpolated yield of two benchmarks or they may be quoted as simple prices.

First the yields of currently traded US Treasuries are determined as known in the art. Instead of using all US Treasury prices, only the on-the-run prices are used. First, the closing prices of every UST and the market prices of all the on-the-runs are collected. Second, a butterfly portfolio for each UST is constructed using the two on-the-runs with the closest durations as barbells. Third, the change in the current present value of each UST is determined by that of the two ends of the barbell, taking into account the butterfly weights.

Subsequently, the prices of the bonds used in a transaction are easily computed based on the spreads quoted by the traders. The yield of a bond is the yield of the benchmark plus the spread. The spread quoted may be based on yield to maturity, yield to call, yield to put, or yield to average life. The date corresponding to settlement of the final transaction has to be used when converting the bond yield to the final bond price.

Upon receiving the actual trading prices from the traders, the optimization is repeated at step 320 and then the results are provided to the clients for a final approval. After all the clients approve the transaction, the tax swap transaction is executed (330).

Alternatively in another preferred embodiment, the actual prices provided by traders may be entered into the system before the complete agreement of the parties on the final transaction has been reached. Specifically, in such an embodiment, the actual prices are introduced when the parties are in substantial but not complete agreement with respect to the proposed swap, so that several final iterations involving optimization are performed with the actual prices obtained from the traders. This embodiment modifies flow-charts of FIGS. 2 and 3 in the following manner. The decision 250 also includes a test of whether such a substantial agreement has been reached. If so, at this point, the actual prices are generated in accordance with the process discussed in connection with step 310 (benchmark pricing). Thereafter, the iterative process proceeds based on actual prices and not using the prices from external databases. When, at 250, the complete agreement has been reached, the transaction is executed.

Figure 4:
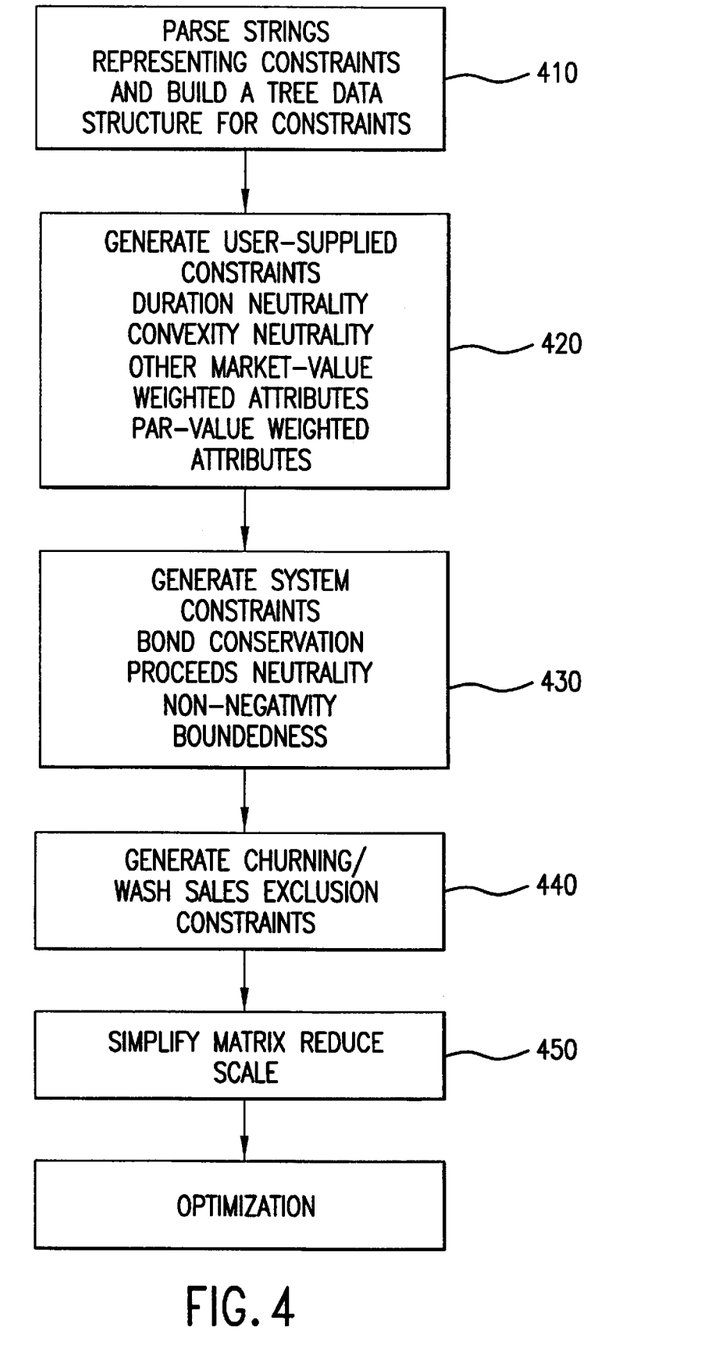
FIG. 4 illustrates the flowchart of the optimization interface software.

The Optimization interface module 40 is now described in further detail in connection with FIG. 4. The formulation of a linear programming problem for input to the optimization engine is specified in terms of an MPS file, which is an industry standard. Input to a linear programming optimizer can be expressed as essentially a system of equations, each of the form:

$$a_1 x_1 + a_2 x_2 + a_3 x_3 + \ldots + a_n x_n \leq b$$

or $$a_1 x_1 + a_2 x_2 + a_3 x_3 + \ldots + a_n x_n = b$$

where $a_i$ are constant coefficients, $x_i$ are variables, b is a constant and n is the number of variables in the system. As known in the art, such expressions are represented in a matrix, which is the exemplary application can be very large, for example, with n of 16,000 and 10,000 equations. Although the matrix is large, most of the coefficients are usually zero. The MPS file format allows the use of a sparse matrix notation, specifying only the non-zero coefficients. A definition of the MPS format is provided in the CPLEX manual, http://www.cplex.com, using the CPLEX Callable Library, Version 4.0, from CPLEX Optimization Inc., 930 Tahoe Blvd., Bldg. 802, Incline Village, Nev. 89451, incorporated herein by reference. The MPS file of the preferred embodiment includes user constraints and system constraints.

At step 410 the optimization interface 40 processes the data stored in the front end 30 so as to convert the formal representation of the constraints into a tree data structure stored in memory. Tree data structures are known in the art and form a portion of computer's memory. The tree data structure produced by the optimization interface comprises nodes representing logical operators and leafs representing sector names (or other constraint information). Such a tree data structure is traversed, as known in the art, in order to convert the formal description of the constraints into data formatted for processing by the optimization engine. The tree data structure is built by parsing the formal description of the constraints in the front end as textual strings using known techniques. Namely, the parenthesis are sorted first and then substrings are parsed left to right.

At step 420, the interface 40 generates the part of the MPS file specifying the linear programming matrix for user constraints. Specified for every bond is a sector membership set (e.g., "FINL,AA"). Also, specified for every constraint is a logical sector specification (e.g., "~(AAA|AA)"). To generate a given constraint, the program loops through every bond (in all portfolios of all participants) and determines the following: (1) does this constraint apply to this bond? and (2) if so, what coefficients should this bond's linear programming variables receive? Two MPS inequalities are generated for each user constraint specified in the front end of the preferred embodiment, because both upper and lower bounds each require an inequality constraint.

If the numerator variable is #ALL then the program does not check for sector inclusion: this bond will have non-zero coefficients. If the numerator variable is #SECTOR then the interface program 40 compares each component of the bond's sector membership set to the logical sector specification of the constraint. For example, if the bond is "FINL, AA" and the constraint is "~(AAA|AA)", then this bond is not bounded by the constraint and its coefficient is zero. To perform a logical comparison, the interface traverses the tree data structure discussed in connection with step 410.

If the bond is constrained, the program determines the proper coefficient $a_i$ for each linear programming variable associated with the bond. A bond has BUY and SELL linear programming variables. Integer linear programming variables are also employed, for example, to prevent churning, wash sales, and ensure group exclusion. The numerator's value specification is used to compute $a_i$, for example, #PV#DUR indicates that the coefficient $a_i$ is computed as the bond's present value times duration. The par amount is contributed by the value of the linear programming variable $x_i$.

The program also accounts for an optional denominator. To save MPS file preparation time, the program generates the denominator only once for both the upper and lower bounds. This is done by generating a new linear programming variable and creating an equality constraint for the denominator.

$$L \leq \frac{\text{numerator}}{\text{demoninator}} \leq U$$
$$x = \text{demoninator}$$

The equality coefficients are generated in a manner similar to the inequality coefficients previously discussed.

The new linear programming variable is then appended to the end of upper and lower bounds inequalities. The coefficient of the new linear programming variable is the negative upper or lower bound, respectively, as illustrated below.

$$Lx \leq \text{numerator} \leq Ux$$
$$\text{numerator} \geq Lx$$
$$\text{numerator} \leq Ux$$
$$\text{numerator} - Lx \geq 0$$
$$\text{numerator} - Ux \leq 0$$

Next, at step 430, the program generates system constraints which include bound conservation constraints as well as other constraints discussed above in connection with the linear programming model. Group exclusion constraints to prevent churning, wash sales, and buying and selling among subsidiaries as discussed above are processed at step 440. These constraints are generated by the system without input from the clients. The programming of generating these constraints is apparent to a person skilled in the art from the previous discussion of these constraints.

As noted at step 430, the optimization interface module 30 generates the part of the MPS file specifying the linear programming matrix for bond conservation and other linear programming constraints is generated. Similarly, at step 430, the optimization interface module generates the part of the MPS file specifying the integer linear programming matrix, namely the churning constraints, the wash sale constraints, and the group exclusion constraints are generated.

The previously described preferred embodiment is neutral with respect to multiple firms, i.e., no firm is given an advantage over another. However, the resultant trades may distribute gains among the firms not completely evenly. Although, completely fair distribution of gains is difficult, the fairness of the distribution can be improved by utilizing one of the techniques discussed below, or other techniques known in the art. Although the solution which does not attempt to achieve a fair distribution is sufficient for the implementation of the preferred embodiment, alternative embodiments may include additional processing that addresses fairness as discussed below.

One such approach to achieving fairness that may be used in an alternative embodiment is to employ a method developed by Shapley for constructing a "fair" solution to the classic coalition problem in game theory. See H. Raiffa, *The Art and Science of Negotiation,* Harvard University Press, Cambridge, 1982, incorporated herein by reference. The general problem considered by Shapley involves n players, each subgroup of which has a given, fixed utility. Usually the largest subgroup, i.e., the entire group, generates greater utility than any other partitioning of the players. The problem addressed by Shapley is to divide the gains among the players so that they all cooperate in a single large coalition rather than splitting apart into cliques. Shapley values give such a division based on fundamental principles, e.g., linear composition of solutions and no payments to players who contribute nothing.

In formulating a tax swap as a coalition problem, the majority of a subgroup's utility is attributed by its tax loss, which can be evaluated with the optimizer for each subgroup. Two additional factors contributing to utility include: 1) a consideration that discount securities (priced below par), purchased in the swap, have a smaller future tax burden than par or premium securities, so that all players wish to swap in discount securities; and 2) by swapping among themselves, the firms have less total transaction costs than the market would charge, especially considering premiums due to the inelasticity of supply of discount bonds. Once these considerations are factored into the subgroup utilities, Shapley values can be computed, to determine a fair division of proceeds.

In some alternative embodiments, it may also be desirable to tilt the objective function. Since the objective function thus far is to maximize total loss, it may be achieved through one firm receiving a disproportionate share of the tax loss relative to other firms. One method of rectifying the immediate book-loss and concomitant tax advantage bias is with the following objective function:

$$\max \sum_{i,j} SELL_{i,j} \alpha_j (BOOK_{i,j} - PRICE_{i,j})$$

where $a_j > 0$ is a constant assigned to firm j in order to control the relative value of its book losses to the overall optimization.

To negotiate an actual deal it is important for the entity acting as an intermediary to standardize security prices in the resulting trades in accordance to the market prices of the corresponding investments. As discussed above, the benchmark pricing module manages such a pricing. The standardized pricing gives the multiple parties to the swap confidence in the impartiality of the intermediary entity. Payment for the services of the intermediary may for example, come from a fixed percentage of realized tax deduction, or using another compensation scheme.

Individual parties must be prevented or at worst dissuaded from "cherry picking" prices or securities, i.e., viewing the optimized trades and selectively committing to only certain trades. For example, a party which avoids an assigned buy trade that is perceived as too expensive is hoping to engage in a form of arbitrage. That party wants to buy at no worse than fair value, but of course does not identify the bonds it is selling above fair value.

The intermediary entity must tightly control the timing of the swap, not allowing individual parties to stretch the target trade date. With time slippage comes the risk that the market will rally. If the market rallies, there will be fewer underwater securities in the pool and less losses embedded in each security. One technique of controlling timing is to limit participation and plan a series of swaps.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, which scope is defined by the following claims.

What is claimed is:

1. A computer method for adjusting portfolios of fixed income instruments of multiple parties, comprising:

storing in memory of at least one computer digital data representing the portfolios of the multiple parties;

storing in the memory of at least one computer digital data representing constraints that define trading requirements of the parties;

converting, using at least one computer, the digital data representing the portfolios of the multiple parties and the digital data representing the constraints of the multiple parties to optimization digital data adapted for processing by an optimization engine;

supplying first pricing information for the fixed-income instruments in the portfolios of the multiple parties from a publically available source;

optimizing using at least one computer the optimization digital data and the first pricing information so as to generate a first set of trades among the parties that rebalance the parties' portfolios of fixed-income instruments in accordance with the constraints that define trading requirements of the parties such that the portfolios are substantially optimized with respect to at least one predetermined objective;

communicating the first set of trades to each of the multiple parties;

receiving approval of the first set of trades from each of the multiple parties;

supplying second pricing information for the fixed-income instruments in the portfolios of the multiple parties, said second pricing information comprising prices quoted by traders of an intermediary entity that facilitates trades among the parties that rebalance the parties' portfolios of fixed-income instruments; and optimizing using at least one computer the optimization digital data and the second pricing information so as to generate a second set of trades among the parties that rebalance the parties' portfolios of fixed-income instruments in accordance with the constraints that define trading requirements of the parties such that the portfolios are substantially optimized with respect to at least one predetermined objective; and executing the second set of trades at the prices quoted by the traders of the intermediary entity.

2. The method of claim 1 wherein the predetermined objective is programmed as an objective function.

3. The method of claim 1 wherein the step of optimizing comprises computer processing of a linear programming problem.

4. The method of claim 1 wherein the step of optimizing comprises computer processing of a mixed integer programming problem.

5. The method of claim 1 wherein the step of converting further comprises converting digital data stored in the memory representing portfolio and constraint data into a matrix digital data suitable for processing by the optimization engine.

6. The method of claim 1 wherein the digital data representing the constraints includes digital data representing user constraints defining relationships between portfolio instruments that should be satisfied in a resultant portfolio produced by the optimization engine during optimizing.

7. The method of claim 6 wherein the user constraints include digital data representing duration neutrality constraints.

8. The method of claim 6 wherein the user constraints include digital data representing convexity neutrality constraints.

9. The method of claim 6 wherein the user constraints including digital data representing par-value weighted attributes.

10. The method of claim 6 wherein the user constraints include digital data representing proceeds bounding within sectors.

11. The method of claim 6 wherein the step of converting includes parsing the user constraints and building a data structure stored in memory of at least one computer as a tree data structure.

12. The method of claim 1 wherein the digital data representing the constraints includes digital data representing system constraints stored in the memory.

13. The method of claim 12 wherein the system constraints include digital data representing bond conservation constraints.

14. The method of claim 12 wherein the system constraints include digital data representing proceeds neutrality constraints.

15. The method of claim 12 wherein the system constraints include digital data representing non-negativity and boundedness.

16. The method of claim 12 wherein the system constraints include mutual exclusion digital data for avoiding churning.

17. The method of claim 12 wherein the system constraints include mutual exclusion digital data for avoiding wash sales.

18. The method of claim 12 wherein the system constraints include digital data for avoiding trading between subsidiaries of the same parent.

19. The method of claim 1 further comprising storing digital data representing an objective function for optimization.

20. The method of claim 19 wherein the objective function substantially maximizes tax deductions generated by traded participants' portfolios.

21. The method of claim 19 wherein the objective function substantially maximizes a total book loss in participants' portfolios.

22. The method of claim 21 wherein the objective function includes data representing economic value of tax deferral.

23. The method of claim 1 wherein the digital data, stored in computer memory, representing the constraints of multiple participants is organized in accordance with a formal grammar.

24. The method of claim 23 wherein the formal grammar includes representation of logical relationships among sectors.

25. The method of claim 23 wherein the formal grammar includes specifying bounded linear constraints.

26. The method of claim 25 wherein the formal grammar comprises specifying base attributes and normalization attributes of the constraints.

* * * * *

UNITED STATES PATENT AND TRADEMARK OFFICE
CERTIFICATE OF CORRECTION

PATENT NO.   : 6,393,409 B2
DATED         : May 21, 2002
INVENTOR(S)  : Young et al.

It is certified that error appears in the above-identified patent and that said Letters Patent is hereby corrected as shown below:

Column 1,
Line 14, change the word "liner" to -- linear --

Column 7,
Line 54, change the word "DUR" to -- $DUR_i$ --

Column 11,
Line 25, replace the equation with:

-- $$\sum_{j \in \theta} BUY_{i,j} < \sum_{j \notin \theta} SELL_{i,j}$$ --

Signed and Sealed this

Twenty-second Day of October, 2002

Attest:

JAMES E. ROGAN
Attesting Officer            Director of the United States Patent and Trademark Office